(No Model.) 2 Sheets—Sheet 1.
C. W. DWELLE.
METAL HOOP AND COUPLING THEREFOR.
No. 494,997. Patented Apr. 4, 1893.
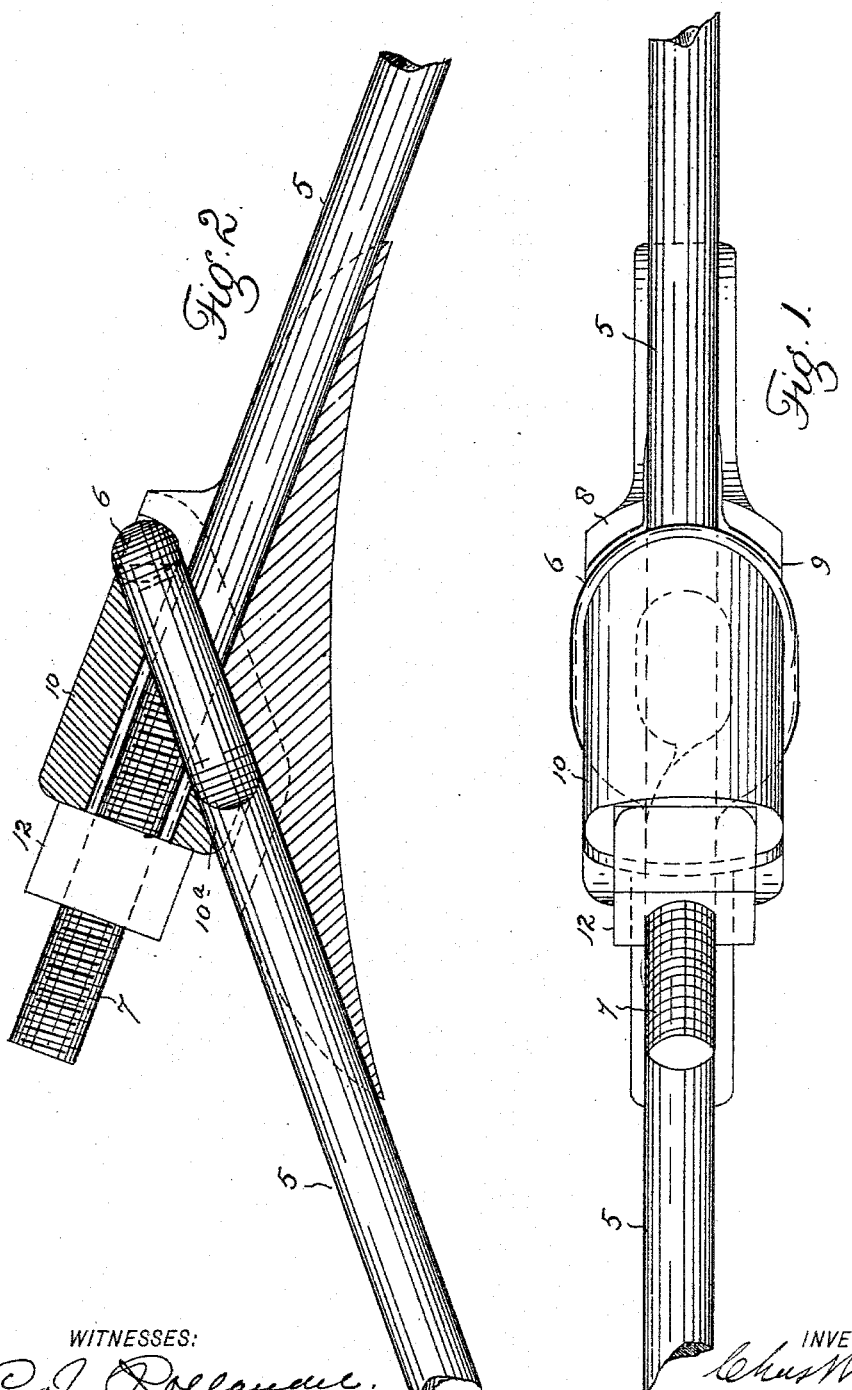

(No Model.) 2 Sheets—Sheet 2.

C. W. DWELLE.
METAL HOOP AND COUPLING THEREFOR.

No. 494,997. Patented Apr. 4, 1893.

WITNESSES:
INVENTOR
C. W. Dwelle
BY
ATTORNEY.

THE NORRIS PETERS CO., PHOTO-LITHO., WASHINGTON, D. C.

UNITED STATES PATENT OFFICE.

CHARLES W. DWELLE, OF DENVER, COLORADO.

METAL HOOP AND COUPLING THEREFOR.

SPECIFICATION forming part of Letters Patent No. 494,997, dated April 4, 1893.

Application filed August 31, 1892. Serial No. 444,707. (No model.)

*To all whom it may concern:*

Be it known that I, CHARLES W. DWELLE, a citizen of the United States of America, residing at Denver, in the county of Arapahoe and State of Colorado, have invented certain new and useful Improvements in Metal Hoops and Couplings Therefor; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hoops and shoes for wooden pipes or conduits and the object of the invention is to attain simplicity of construction with a maximum of strength and durability.

To this end the improvement consists of the features, arrangements and combinations hereinafter described and claimed and will be fully understood by reference to the accompanying drawings in which is illustrated an embodiment thereof.

Figure 3:
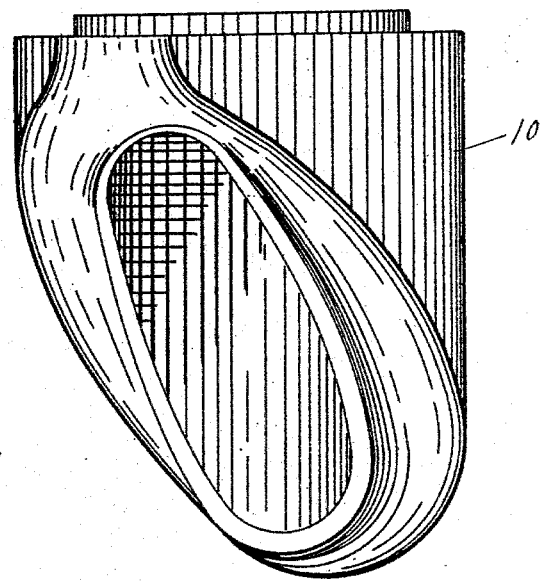
Figure 4:
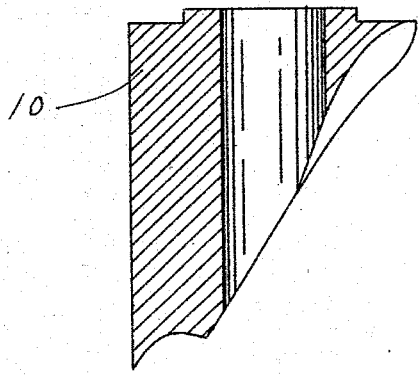

In the drawings, Figure 1 is a top or plan view showing the extremities of the hoop united by the coupling shoe. Fig. 2 is a longitudinal vertical section through the center of the shoe. Fig. 3 is a perspective view in detail of the washer. Fig. 4 is a longitudinal section of the same.

Similar reference characters indicating corresponding parts or elements of the mechanism in the several views let the numeral 5 designate a metal hoop surrounding a wooden pipe. This hoop or strap bolt is threaded at one extremity as shown and provided with an eye at the opposite extremity. The hoop extremities engage a metal shoe 8 centrally recessed as shown at 9 to receive the eye of the hoop, the parts of the shoe on either side of the recess 9 being provided with open grooves. The hoop engages these grooves as it is drawn around the pipe, the threaded extremity passing through the eye. An apertured lug or washer 10 is slipped over the threaded extremity and engages the eye of the opposite extremity, a nut 12 being screwed upon the hoop to engagement with the washer. This lug or washer enters the eye 6 as shown at 9ª, but also overlaps the hook end of the same as shown at 10ª, thus forming a lock for the eye and making it impossible for it to open as the nut is screwed down in tightening the hoop.

Having thus described my invention, what I claim is—

1. A metal hoop having an eye at one extremity and a nut at the opposite extremity in combination with a coupling shoe provided with open grooves to receive the hoop extremities and a recess to receive the hoop-eye, and a washer through which the threaded end of the hoop passes, said washer being grooved on its inner surface and engaging the eye of the hoop both interiorly and exteriorly, and a nut screwed upon the hoop to engagement with the washer, substantially as described.

2. A metal hoop having an eye at one extremity and a nut at the opposite extremity in combination with a coupling shoe recessed to receive the eye of the hoop and a lug or washer apertured to receive the threaded extremity of the hoop the same being located between the nut and the eye and provided with a projection engaging the latter interiorly, substantially as described.

3. A metal hoop having an eye at one extremity and a nut at the opposite extremity in combination with a coupling shoe grooved to engage the body of the hoop and centrally recessed to receive the eye extremity, and a lug or washer apertured to receive the threaded extremity of the hoop, the same being located between the nut and the eye and grooved on its inner surface to engage the latter, substantially as described.

4. The combination with a suitable coupling shoe, of a metal hoop having an eye at one end and a nut at the other end the hoop being threaded to receive the nut, and an intermediate lug or washer apertured to receive the threaded extremity of the hoop and grooved to engage the eye extremity, substantially as described.

5. The combination with a metal hoop threaded at one extremity to receive a nut and having an eye at the opposite extremity through which the threaded end passes, and a washer located between the nut and the eye and beveled on its inner surface at a suitable angle to the axis of its aperture, substantially as described.

6. The combination with a suitable coupling shoe and a metal hoop threaded at one extremity and provided with an eye at the opposite extremity, the extremities of the hoop engaging the shoe which forms a suitable bearing therefor, the threaded extremity of the hoop being provided with a nut and a beveled washer located between the nut and the eye, its inner or beveled surface engaging the latter, substantially as described.

In testimony whereof I affix my signature in presence of two witnesses.

CHARLES W. DWELLE.

Witnesses:
WM. MCCONNELL,
W. R. WILCOX.